J. NEY, Jr.
MACHINES FOR CATCHING COLORADO BUGS.
No. 169,656. Patented Nov. 9, 1875.
Fig: 1.
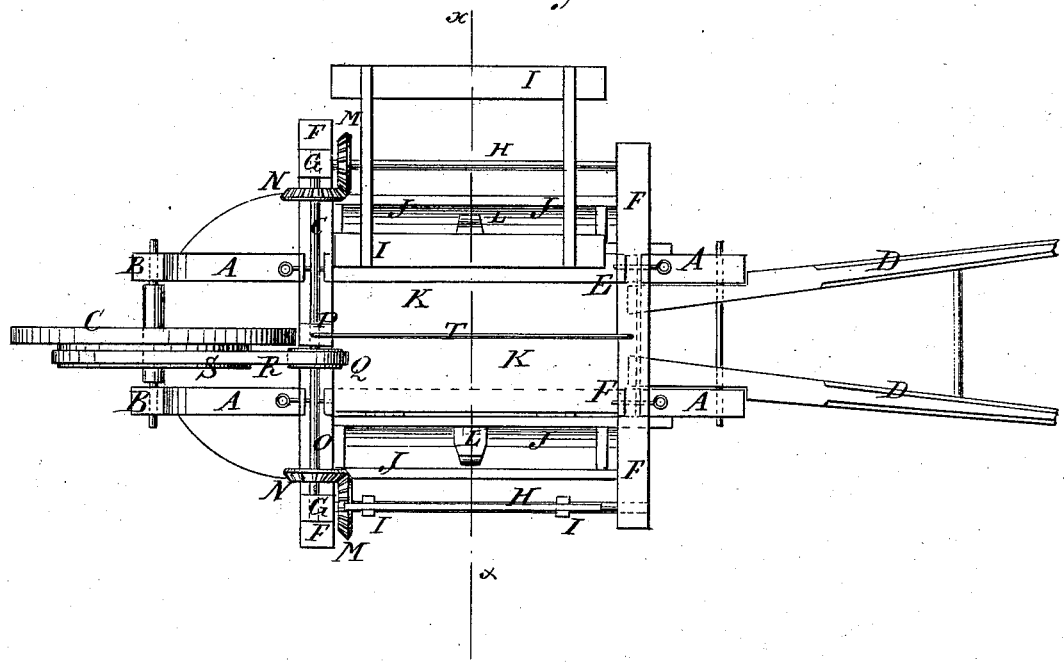
Fig: 2.
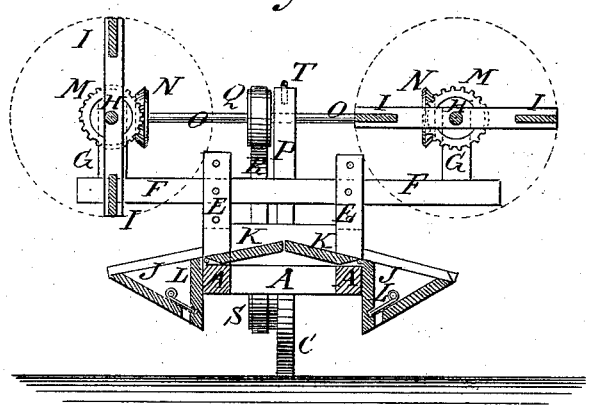
WITNESSES:
INVENTOR: John Ney, Jr.
BY
ATTORNEYS.

UNITED STATES PATENT OFFICE.

JOHN NEY, JR., OF ELLICE, ASSIGNOR TO HIMSELF AND AARON ELEY, OF BERLIN, CANADA.

IMPROVEMENT IN MACHINES FOR CATCHING COLORADO BUGS.

Specification forming part of Letters Patent No. 169,656, dated November 9, 1875; application filed December 12, 1874.

*To all whom it may concern:*

Be it known that I, JOHN NEY, Jr., of Ellice, Perth county, Province of Ontario, Dominion of Canada, have invented a new and useful Improvement in Machine for Catching Colorado Bugs, of which the following is a specification:

Figure 1 is a top view of my improved machine; and Fig. 2 is a vertical cross-section of the same, taken through the line $x\ x$, Fig. 1.

Similar letters of reference indicate corresponding parts.

The invention will first be fully described, and then pointed out in the claim.

A is the frame of the machine, consisting of the two side bars, connected at a little distance from their ends by cross-bars. To the forward ends of the side bars of the frame A are attached the lower ends of short posts B, which incline slightly forward, and have several holes formed in them to receive the journals of the wheels C, so that the height of the machine above the ground can be readily adjusted according to the height of the plants to be operated upon. To the rear ends of the side bars of the frame A are attached handles D, somewhat similar to plow-handles, and by means of which the machine is guided and propelled. To the side bars of the frame A, at or near the ends of the cross-bars of said frame, are attached the ends of four posts, E, the upper ends of which are slotted to receive the cross-bars F, where they are secured by pins or bolts. Several holes are made in the slotted ends of the posts E to receive the said pins or bolts, to enable the cross-bars F to be conveniently raised and lowered according to the height of the plants to be operated upon. The two forward posts E are made shorter than the two rear posts E, and to the upper side of the ends of the forward cross-bar F are attached the lower ends of two short posts, G, in the upper ends of which, and in the ends of the rear cross-bar F, revolve the ends of two shafts, H, to which are rigidly attached the wings I.

The wings I, as the shafts H are revolved, strike the plants and knock the bugs into the troughs or boxes J, attached to the outer sides of the side bars of the frame A.

The troughs or boxes J are provided with covers K, hinged at their inner edges to the upper edges of the inner sides of the troughs or boxes J, and which, when turned back, meet in the center of the machine and form inclined platforms or aprons, to receive any bugs that may be thrown beyond said troughs or boxes, and down which the said bugs slide into the said troughs or boxes. The troughs or boxes J have openings in their bottoms, closed with slides L, to enable the bugs to be conveniently removed and destroyed. To the forward parts of the shafts H are attached bevel-gear wheels M, the teeth of which mesh into the teeth of the bevel-gear wheels N, attached to the cross-shaft O. The cross-shaft O revolves in bearings in the upper ends of the posts G, and of the post P, attached to the center of the front cross-bar F; and to it is attached a pulley, Q, around which passes a belt, R, which also passes around a pulley, S, attached to the hub of the wheel C, so that the wings I may be revolved by the advance of the machine. The frame-work of the machine is strengthened by a tie-rod, T, the forward end of which is attached to the upper end of the post P, and its rear end is attached to the center of the rear cross-bar F.

The aprons thus serve not only the purpose of a trough, but to prevent the escape of the insects, being, for the latter purpose, turned over the boxes at the sides as soon as the machine is stopped.

Having thus described my invention, I claim as new and desire to secure by Letters Patent—

The combination, on a wheeled frame with winged and revolving shafts H I, of the boxes J, having hinged covers K, turning back, meeting on the center, and forming inclined aprons, as and for the purpose specified.

JOHN NEY, JR.

Witnesses:
J. KOSTNER,
P. ALLES.